United States Patent
Nelboeck et al.

(10) Patent No.: US 10,494,953 B2
(45) Date of Patent: Dec. 3, 2019

(54) CASING FOR AN AIRCRAFT ENGINE AND METHOD FOR PRODUCING A CASING OF SAID TYPE

(71) Applicant: FACC AG, Ried im Innkreis (AT)

(72) Inventors: Guenter Nelboeck, Seewalchen (AT); Andreas Wuertinger, Mehrnbach (AT); Walter Fuerst, Vienna (AT)

(73) Assignee: FACC AG, Ried im Innkreis (AT)

( * ) Notice: Subject to any disclaimer, the term of this patent is extended or adjusted under 35 U.S.C. 154(b) by 286 days.

(21) Appl. No.: 15/508,898

(22) PCT Filed: Sep. 1, 2015

(86) PCT No.: PCT/AT2015/050207
§ 371 (c)(1),
(2) Date: Mar. 3, 2017

(87) PCT Pub. No.: WO2016/033624
PCT Pub. Date: Mar. 10, 2016

(65) Prior Publication Data
US 2017/0198606 A1    Jul. 13, 2017

(30) Foreign Application Priority Data
Sep. 4, 2014   (AT) .............................. A 50609/2014

(51) Int. Cl.
*F01D 25/24*   (2006.01)
*B29C 70/32*   (2006.01)
(Continued)

(52) U.S. Cl.
CPC .............. *F01D 25/24* (2013.01); *B29C 70/06* (2013.01); *B29C 70/32* (2013.01); *F01D 21/045* (2013.01);
(Continued)

(58) Field of Classification Search
CPC ........ F01D 25/14; F01D 25/24; F01D 21/045; B29C 70/06; B29C 70/32; B29C 70/30; Y02T 50/672; F05D 2300/6034
See application file for complete search history.

(56) References Cited

U.S. PATENT DOCUMENTS 5,863,365 A  *  1/1999  Bird .................... B29C 37/0064
                                                            156/245
2004/0211167 A1 * 10/2004 Schreiber .............. F01D 21/045
                                                            60/226.1
(Continued)

FOREIGN PATENT DOCUMENTS

| EP | 1646776 B1 | 3/2008 |
| EP | 2497626 A1 | 9/2012 |
| WO | 2012065155 A1 | 5/2012 |

OTHER PUBLICATIONS

ISA European Patent Office, International Search Report Issued in Application No. PCT/AT2015/050207, dated Nov. 30, 2015, WIPO, 6 pages.
(Continued)

*Primary Examiner* — Charles G Freay
(74) *Attorney, Agent, or Firm* — McCoy Russell LLP (57) ABSTRACT

The invention relates to a casing for an aircraft engine, in particular a bypass pipe or fan casing, consisting of a plurality of hardened prepreg plies in which the fibers are oriented differently, and to a method for producing a casing of said type. In order to improve the resistance properties of the casing, especially in fire resistance tests, and reduce the amount of wasted prepreg material, at least one reinforcement ply is provided that consists of a prepreg strip having several windings, and the prepreg strip of each reinforcement ply includes a lateral overlapping portion.

16 Claims, 8 Drawing Sheets

(51) Int. Cl.
*F01D 21/04* (2006.01)
*B29C 70/06* (2006.01)
*F01D 25/14* (2006.01)
*B29C 70/30* (2006.01)

(52) U.S. Cl.
CPC .............. *F01D 25/14* (2013.01); *B29C 70/30* (2013.01); *F05D 2300/6034* (2013.01); *Y02T 50/672* (2013.01)

(56) References Cited

U.S. PATENT DOCUMENTS

| | | | |
|---|---|---|---|
| 2009/0294567 A1 | 12/2009 | Witmer et al. | |
| 2012/0251305 A1* | 10/2012 | McMillan | F01D 5/28 415/182.1 |
| 2013/0216367 A1 | 8/2013 | Lussier et al. | |
| 2013/0251958 A1* | 9/2013 | Gawn | B29C 70/083 428/189 |
| 2016/0327061 A1* | 11/2016 | Mandel | F02C 7/25 |

OTHER PUBLICATIONS

International Bureau of WIPO, Internationality Preliminary Report on Patentability Issued in Application No. PCT/AT2015/050207, dated Mar. 9, 2017, WIPO, 6 pages.

\* cited by examiner

CASING FOR AN AIRCRAFT ENGINE AND METHOD FOR PRODUCING A CASING OF SAID TYPE

CROSS-REFERENCE TO RELATED APPLICATIONS

The present application is a U.S. National Phase of International Patent Application Serial No. PCT/AT2015/050207, entitled "CASING FOR AN AIRCRAFT ENGINE, AND METHOD FOR PRODUCING A CASING OF SAID TYPE," filed on Sep. 1, 2015. International Patent Application Serial No. PCT/AT2015/050207 claims priority to Austrian Patent Application No. A 50609/2014, filed on Sep. 4, 2014. The entire contents of each of the above-cited applications are hereby incorporated by reference for all purposes.

TECHNICAL FIELD

The invention relates to a casing for an aircraft engine, in particular a bypass pipe or fan casing, consisting of a plurality of hardened prepreg plies in which the fibers are oriented differently.

BACKGROUND AND SUMMARY

Furthermore, the invention relates to a method for producing such a casing for an aircraft engine, whereby several prepreg plies in which fibers are oriented differently are arranged and hardened on a mold.

For reducing the weight of aircraft components also casings of aircraft engines, in particular bypass pipes or so-called fan casings are increasingly made of fiber-reinforced plastics. Usually the casing is made of several prepreg plies, whereby the individual prepreg plies are again made of several, usually 3 to 4 segments arranged in the peripheral direction of the casing in an overlapping manner. To improve the bending and torsional strengths, the orientation of the fibers of the individual prepreg plies is selected with different angles, in particular 0° and 90° for the bending load and +/−45° for the torsional load.

In particular, bypass pipes which form the outer boundary of the so-called bypass duct, the annular gap around the engine, and fan casings, that is cylinder-shaped casings of the propeller of the engine are produced as casings for aircraft engines.

For example, EP 1 646 776 B1 describes an aircraft engine comprising such a bypass casing.

The US 2013/0216367 A1 relates to a fan casing for an aircraft engine consisting of windings made of threads and non-crimp fabrics, the main focus being directed to the strength in the case of breaking of the propeller of the engine, whereas no fire resistance is described.

What is of disadvantage in such casings is the relatively high waste of prepreg materials, in particular in an orientation of the fibers in the range of +/−45°, since the raw materials for the prepregs are usually available on continuous reels having longitudinally extending fibers. In addition, the lack of uninterrupted fibers extending about the entire circumference of the casing will lead to a loss of strength, which in particular in fire resistance tests required in the aircraft industry may result in the dissolution of the plies and in a rejection of the component.

As a matter of fact, the disadvantage with respect to the strength may be improved by reducing the amount of segments per prepreg ply and at best by increasing the overlapping portion, however, the disadvantage of a large quantity of waste, in particular in the case of transversely extending fibers continues to exist and will result in increased production costs.

It is the object of the present invention to provide an above casing for an aircraft engine and a method for producing such a casing, by which the strength properties can be improved and production costs be reduced. Disadvantages of known casings or methods for producing such casings are to be avoided or at least reduced.

The object is achieved by a casing cited above, wherein at least one reinforcement ply is provided that consists of a prepreg strip having several windings, and the prepreg strip of each reinforcement ply includes a lateral overlapping portion. By the additional arrangement of such reinforcement plies formed by a prepreg strip, which can be arranged in several windings to form the casing, the strength of the casing can be increased essentially. Furthermore, prepreg plies having a transverse fiber orientation, which result in a high amount of waste, can be prevented by arranging the prepreg strips of each reinforcement ply accordingly. Thus, the production costs can be reduced, without reducing the strength properties of the casing. The fibers of the prepreg strip of each reinforcement ply are available across the at least one winding, preferably without interruption. The strength of the casing can be increased further by the lateral overlapping of the prepreg strip. In particular, a delamination in fire resistance tests can be prevented effectively or at least be complicated.

According to a further feature of the invention the prepreg strip of each reinforcement ply has a length corresponding to at least the periphery of the casing to be formed and a width corresponding to a fraction of the length of the casing. Thus, the reinforcement ply of the casing is produced by a prepreg strip which is wound around several times. Depending on the width of the prepreg strip and the overlapping of the prepreg strip from one winding to the next winding the prepreg strip has to be wound around the previous prepreg ply or the respective base often enough.

The windings of the prepreg strip of each reinforcement ply may have a constant pitch angle. The result of such an essentially constant pitch angle will be a corresponding inclination of the fibers present in the prepreg strip (usually available in the longitudinal direction of the prepreg strip), whereby the torsional strength of the casing can be increased, without having to use prepregs with a transverse fiber direction.

Alternatively, the windings of the prepreg strip of each reinforcement ply may also have a constant pitch. Instead of a constant pitch angle described above, the winding of a prepreg strip of each reinforcement ply may also extend essentially straight and be deflected or displaced only to form the next winding essentially by a width of the prepreg strip, which will be repeated as often as desired in each winding of the prepreg strip. It is important in this connection that at least the majority of the fibers of the prepreg strip are present across at least one winding without interruption.

The windings of the prepreg strip of each reinforcement ply may be arranged crosswise. An especially high torsional strength is achieved by such a crosswise arrangement of the windings of the prepreg strip of a reinforcement ply. Nevertheless, a prepreg strip with longitudinally extending fibers can be used with or without essential waste.

If the fibers of at least one prepreg ply and of at least one reinforcement ply have an orientation of essentially 0° or 90°, the waste can be minimized correspondingly. Using the majority or prepreg plies and prepreg strips with such an orientation of the fibers or minor deviations thereof will result in a very low amount of waste. The required torsional strength is achieved additionally by a transverse course of the prepreg strips of each reinforcement ply.

Each prepreg ply preferably consists of several, preferably 3 or 4 segments having a width which essentially corresponds to the length of the casing, and the segments are arranged with an overlapping portion in the peripheral direction of the casing. This construction known per se is now combined with at least one reinforcement ply, at best several reinforcement plies comprising prepreg strips correspondingly wrapped around, whereby an increase in strength can be achieved.

The fibers may be made of carbon fibers and/or glass fibers and/or aramide fibers and/or ceramic fibers. The type of reinforcement fibers used and their orientation are adapted to the respective applications and requirements.

The object is also achieved by a method of production mentioned above, wherein in addition to the prepreg plies at least one reinforcement ply made of a prepreg strip arranged in several windings is arranged on the mold prior to hardening, whereby the prepreg strip of each reinforcement ply is arranged with a lateral overlapping portion. As mentioned above, the strength of the casing can be increased by using such a reinforcement ply and the production costs can be reduced by reducing the waste of the prepreg materials. Concerning the other advantages reference is made to the above description of the casing.

The prepreg strip of each reinforcement ply can be arranged with an essentially constant pitch angle or a continuous pitch.

If the windings of the prepreg strip of each reinforcement ply are arranged crosswise, in particular an increase in the torsional strength can be achieved.

Preferably, at least one prepreg ply and at least one reinforcement ply are used, in which the fibers are oriented at essentially 0° and 90°, respectively. As mentioned above, this can reduce the waste and thus the production costs.

For forming each prepreg ply several, preferably 3 or 4 segments having a width, which corresponds to the length of the casing, are arranged with an overlapping portion in the peripheral direction of the casing.

Preferably, prepreg plies and reinforcement plies having fibers made of carbon and/or glass and/or aramide and/or ceramics are used.

BRIEF DESCRIPTION OF THE FIGURES

The invention will be described in more detail with reference to the enclosed drawings, in which.

DETAILED DESCRIPTION

Figure 1A:
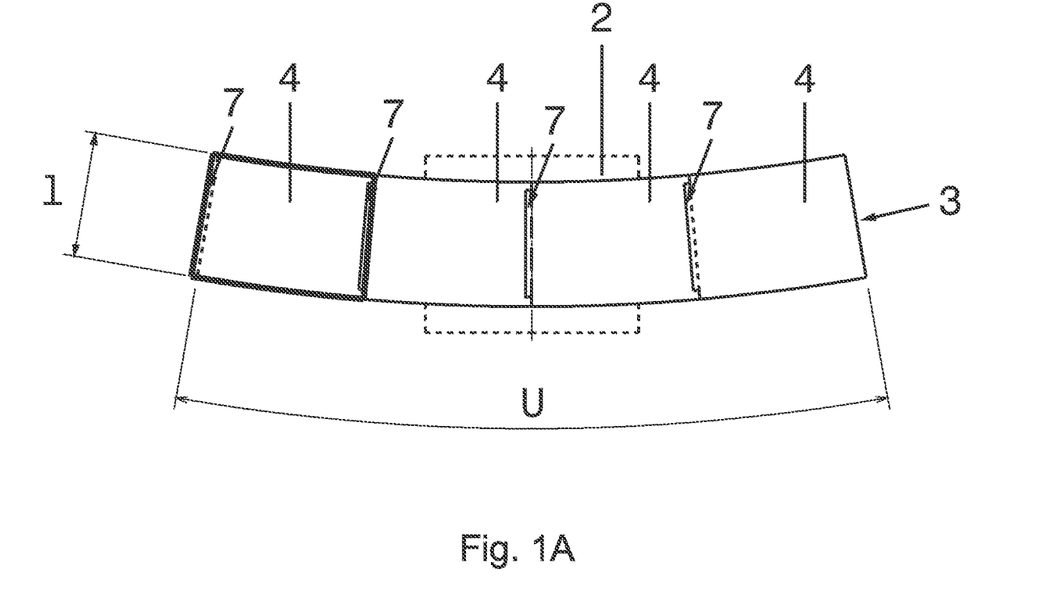
FIG. 1A shows a view of a conventionally produced casing for an aircraft engine in a developed view.

FIG. 1A shows a view of a conventionally produced casing 1 for an aircraft engine 2 in a developed view. A prepreg ply 3 is arranged which is made of several, here four segments 4 having a width $b_B$ essentially corresponding to the length 1 of the casing 1. To increase the strength, the individual segments 4 are arranged with an overlapping portion 7 in the peripheral direction of the casing 1. The fiber direction of the fibers 9 of the segments 4 of the prepreg plies 3 are indicated by corresponding lines in FIG. 1B. Here, the fibers 9 of the segments 4 are arranged in the peripheral direction of the casing 1 or at an angle of 90° in relation thereto, thus not producing any substantial waste, since the segments 4 of the prepreg plies 3 are usually made of raw material in the form of endless webs having such an orientation of fibers. However, a transverse arrangement of the fibers 9 (such as is indicated in the segment 4 of the next prepreg ply 3), which is necessary to achieve a higher torsional strength of the casing 1, results in more waste and thus in an increase of the production costs.

Figure 1B:
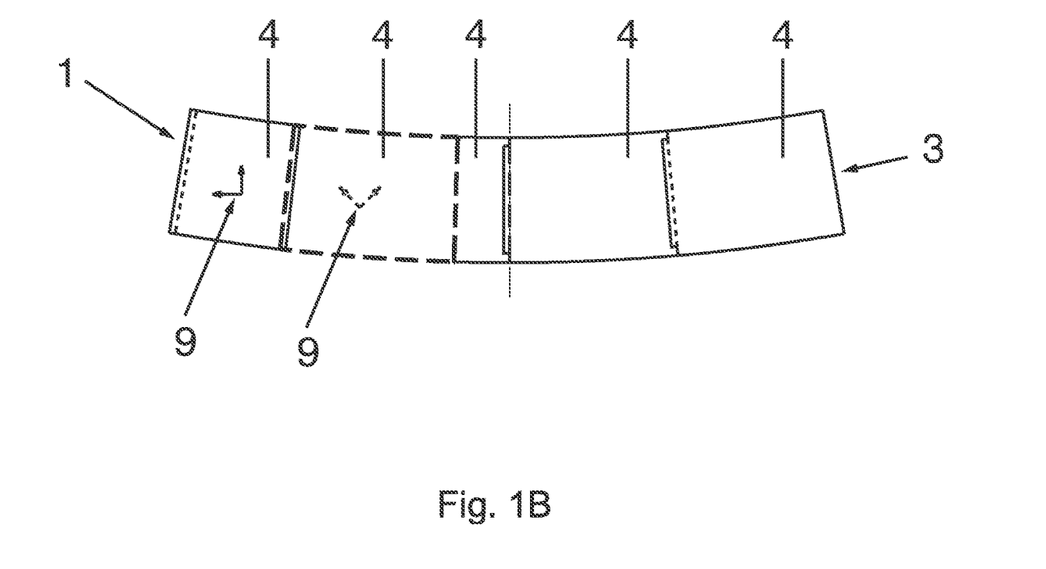
FIG. 1B shows another view of a conventionally produced casing for an aircraft engine in a developed view.

Usually, several prepreg plies 3, for example four to six prepreg plies 3, are arranged one above the other and then hardened in an autoclave at the appropriate temperature and the appropriate pressure. The necessary strength of the component can be obtained by combining prepreg plies 3 in which the fibers 9 are oriented differently. Usually, the bending strength is obtained by combining prepreg plies 3 with a fiber direction of 0° and 90° and the torsional strength is obtained by combining prepreg plies 3 having fiber directions of +/−45°.

Figure 2:
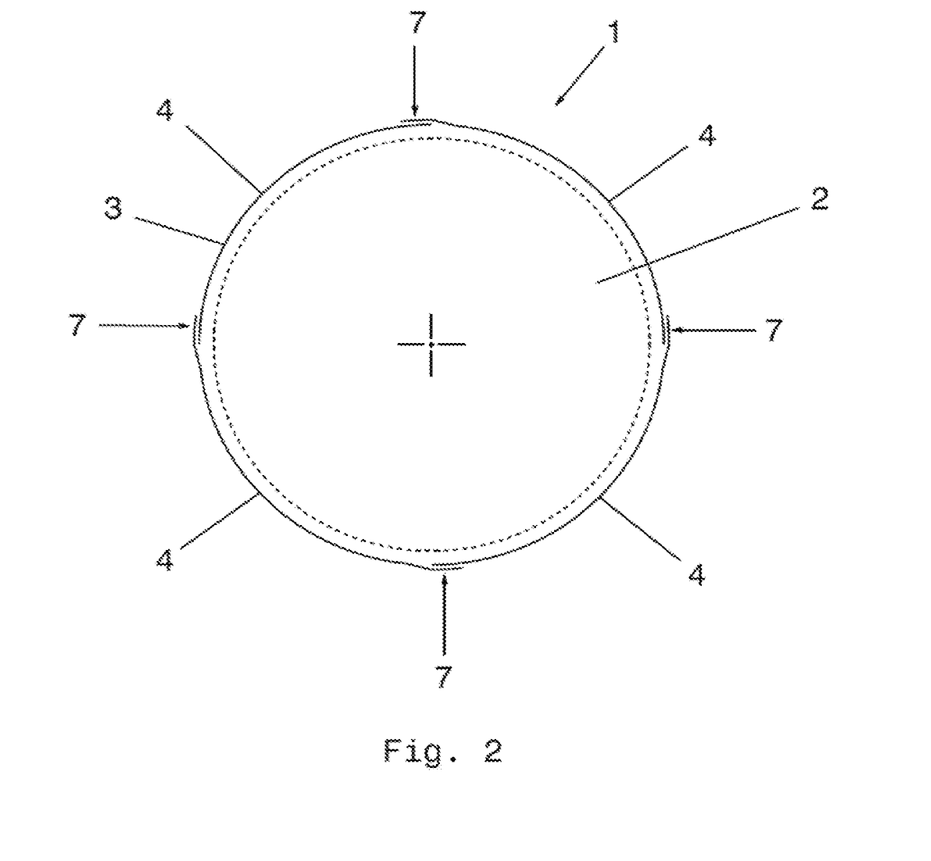
FIG. 2 shows a schematic cross-section of a conventionally produced casing for an aircraft engine.

FIG. 2 shows a schematic cross-section of a conventionally produced casing 1 for an aircraft engine 2. Here, four segments 4 are used for each prepreg ply 3, which for forming the overlapping portion 7 include a little bit more than 90° of the casing 1. In such a construction, in addition to the large amount of waste, the use of segments 4 with a transverse course of the fibers 9 will result in a loss of strength in the area of the overlapping portion 7, in particular in a delamination in fire resistance tests under high temperatures (e. g. 250° C.) with which the resin of the prepreg ply 3 is liquefied.

Figure 3:
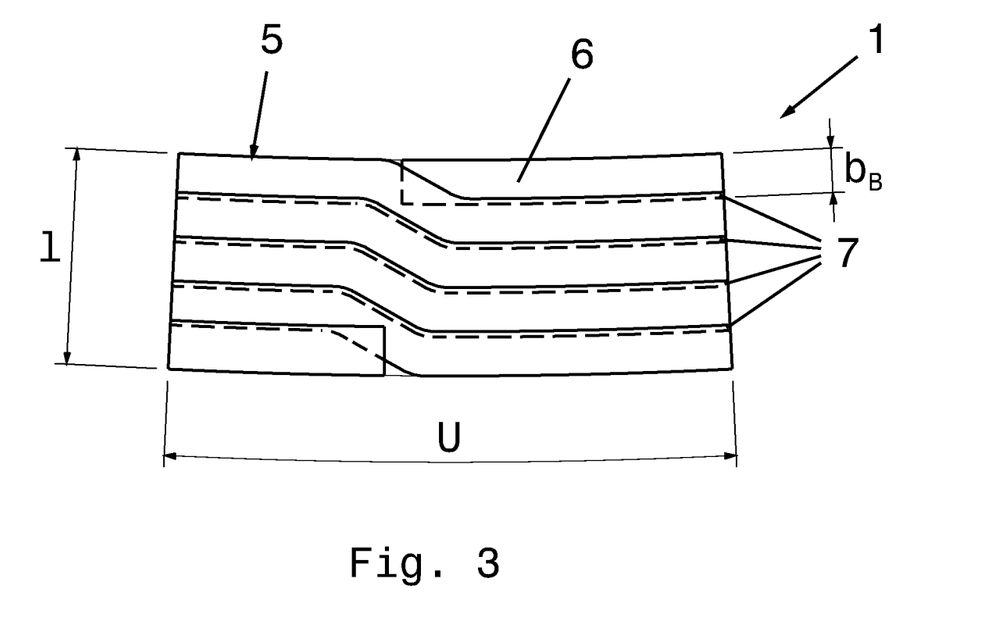
FIG. 3 shows a view of a reinforcement ply according to the invention of a casing for an aircraft engine in a developed view.

FIG. 3 shows a view of a reinforcement ply according to the invention of a casing 1 for an aircraft engine 2 in a developed view. A reinforcement ply 5 is formed by a prepreg strip 6 which is wrapped around in several (here 5) windings. In the shown example, the prepreg strip 6 is not wrapped around at a constant pitch, but prior to reaching the beginning of the prepreg strip 6, is arranged in a straight forward route and then shifted or offset by a width $b_B$ of the prepreg strip 6 and continued to be wrapped. This results in a lateral overlapping portion 7 of the prepreg strip 6, which increases the strength of the casing 1 accordingly. In this manner, a delamination in fire resistance tests is counteracted accordingly.

Figure 4:
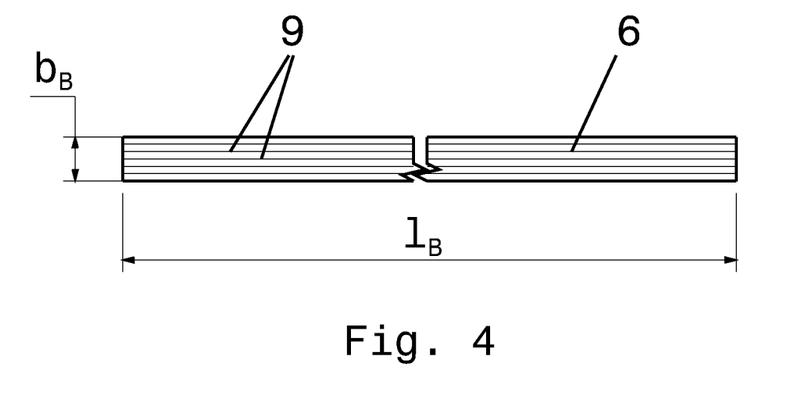
FIG. 4 shows a schematic diagram of a prepreg strip for forming a reinforcement ply.

FIG. 4 shows a schematic diagram of a prepreg strip 6 for forming a reinforcement ply 5 of the casing 1. The prepreg strip 6 is cut out of an endless prepreg material having a corresponding fiber direction (here in the direction of the longitudinal extension of the prepreg strip 6), so that essentially no waste is produced, unlike in conventional production methods. Even if the fiber direction of the fibers 9 of the prepreg strip 6 is twisted by 90° as compared to the shown variant, the result will be lower waste than in the case of fibers 9 arranged transversely, e. g. at an angle of +/−45°.

FIGS. 5A to 5E show side views of a casing 1 in several production steps, constructed according to the invention.

Figure 5A:
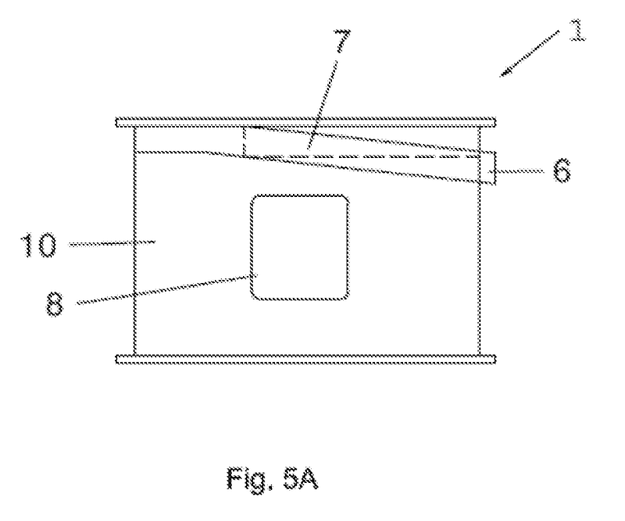
FIG. 5A shows a side view of a casing, constructed according to the invention, at a first example production step.

FIG. 5A shows an essentially cylindrical mold 10 for the production of a casing 1 for an aircraft engine 2, whereby a maintenance opening 8 is arranged which is used for inspection and maintenance of the aircraft engine 2 arranged in operation under the casing 1. In FIG. 5A a prepreg strip 6 for forming a reinforcement ply 5 is arranged by a bit more than one winding around the mold 10, whereby the winding of the prepreg strip 6 extends essentially horizontally, and upon reaching one winding, is offset essentially by the width $b_B$ of the prepreg strip 6. In the area of the overlapping portion 7 of the first web the result will be accordingly changed fiber directions of the fibers 9 of the prepreg strip 6, which in turn have a positive effect for the torsional strength.

Figure 5B:
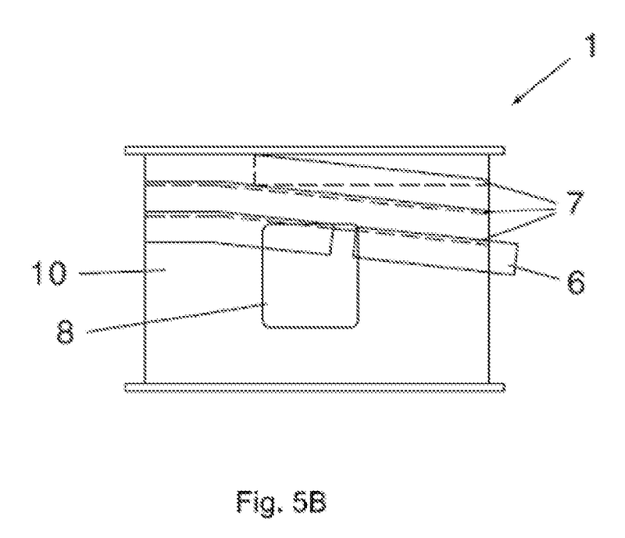
FIG. 5B shows a side view of a casing, constructed according to the invention, at a second example production step.

In FIG. 5B more than three windings of the prepreg strip 6 have been already laid around the mold 10 and the prepreg strip 6 was cut out accordingly in the area of the maintenance opening 8. This cutout may take place in the soft, not yet hardened condition of the prepreg with the help of corresponding cutting tools or after hardening of the casing 1 in the autoclave by means of suitable milling tools.

Figure 5C:
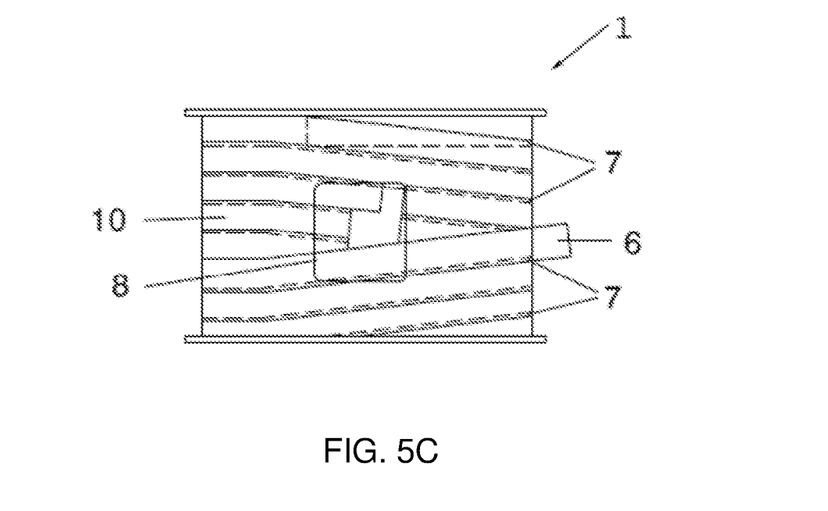
FIG. 5C shows a side view of a casing, constructed according to the invention, at a third example production step.

FIG. 5C shows the casing 1 or the reinforcement ply 5, whereby the windings of the prepreg strip 6 are arranged crosswise, resulting in different fiber directions of the fibers 9 of the prepreg strip 6, which again leads to a higher torsional strength. The maintenance opening 8 was partially released by cutting the prepreg strip 6 out accordingly.

Figure 5D:
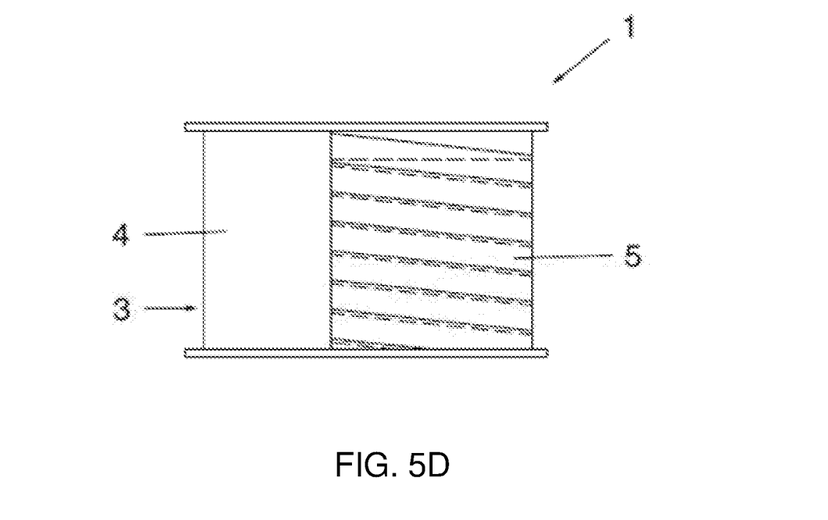
FIG. 5D shows a side view of a casing, constructed according to the invention, at a fourth example production step.

FIG. 5D shows a stage of producing the casing 1, in which one segment 4 of a prepreg ply 3 was laid over a reinforcement ply 5.

Figure 5E:
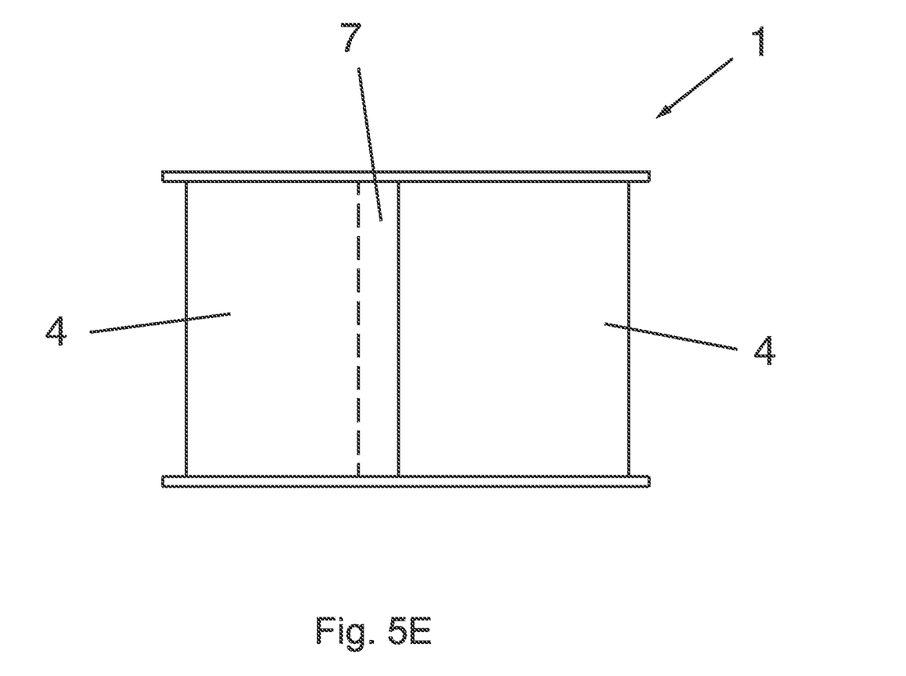
FIG. 5E shows a side view of a casing, constructed according to the invention, at a fifth example production step.

In the view according to FIG. 5E, a further segment 4 of a prepreg ply 3 having an overlapping portion 7 is placed in the peripheral direction of e.g. 20°. Depending on the application, four, six or more such prepreg plies 3 and reinforcement plies 5 are arranged on top of each other and are combined and thereupon hardened in the autoclave at the appropriate temperature and the appropriate pressure.

Figure 6A:
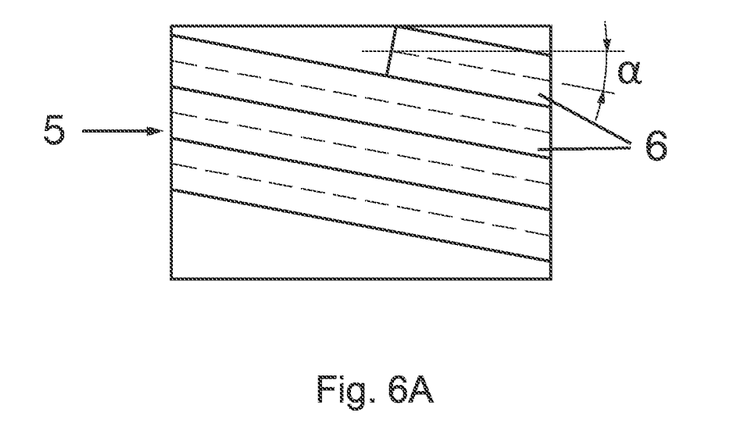
FIG. 6A shows a variant of the pathway of a prepreg strip of a reinforcement ply.
Figure 6B:
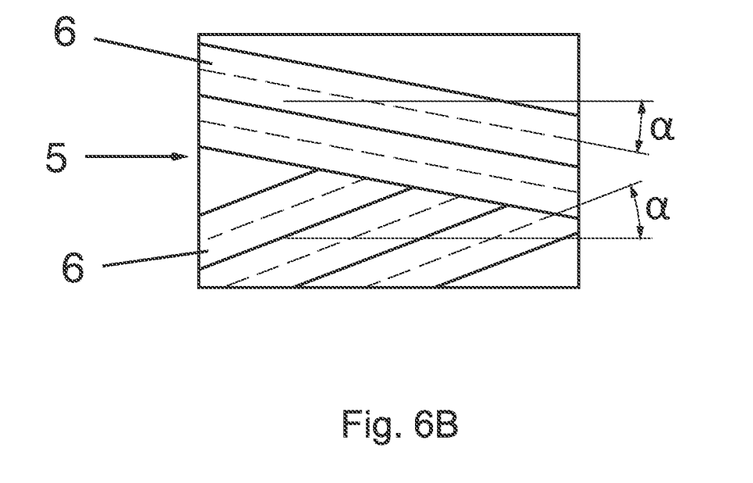
FIG. 6B shows another variant of the pathway of a prepreg strip of a reinforcement ply.

Finally, FIGS. 6A and 6B show two variants of the pathway of a prepreg strip 6 of a reinforcement ply 5 of the casing 1 according to the invention. In the view according to FIG. 6A the prepreg strip 6 of the reinforcement ply 5 is wrapped around with a constant pitch angle α (as opposed to what is shown in FIG. 3). The representation according to FIG. 6B shows a crosswise arrangement of the prepreg strips 6 of the reinforcement ply 5, whereby the fiber direction is arranged according to the different pitch angles +/−α, resulting in a higher torsional strength of the casing 1.

The present invention makes possible the production of a casing 1 for aircraft engines 2, in particular a bypass pipe or fan casing, having a higher strength and a lower waste and thus lower production costs. In particular, the delamination of the prepreg plies in fire resistance tests under relatively high temperatures can be prevented or at least reduced.

The invention claimed is:

1. A casing for an aircraft engine comprising of a plurality of hardened prepreg plies, wherein fibers within each of the plurality of prepreg plies are oriented differently from one another, wherein each of said prepreg plies comprise several segments having a width essentially corresponding to a length of the casing, and the segments are arranged with an overlapping portion in a peripheral direction of the casing, wherein, in combination with the prepreg plies, at least one reinforcement ply is provided that consists of a prepreg strip arranged in several windings, wherein fibers of the prepreg strip are further arranged in a direction of a longitudinal extension of the prepreg strip, and the prepreg strip of each reinforcement ply includes a lateral portion of one winding of the several windings overlapping a next winding of the several windings of the prepreg strip.

2. The casing according to claim 1, wherein the prepreg strip of each reinforcement ply has a length corresponding to at least a periphery of the casing, and has a width corresponding to a fraction of the length of the casing.

3. The casing according to claim 1, wherein the several windings of the prepreg strip of each reinforcement ply have constant pitch angles.

4. The casing according to claim 1, wherein the several windings of the prepreg strip of each reinforcement ply have a continuous pitch.

5. The casing according to claim 1, wherein the several windings of the prepreg strip of each reinforcement ply are arranged crosswise.

6. The casing according to claim 1, wherein the fibers of at least one prepreg ply have an orientation of 0° or 90° relative to each other.

7. The casing according to claim 1, wherein each prepreg ply is made of three or four segments.

8. The casing according to claim 1, wherein the fibers of the prepreg strip of the at least one reinforcement ply and/or the fibers of the prepreg plies are made of carbon fibers and/or glass fibers and/or aramide fibers and/or ceramic fibers.

9. The casing according to claim 1, wherein the casing is a bypass pipe or a fan casing.

10. A method for producing a casing for an aircraft engine whereby fibers within each of several prepreg plies are oriented differently from one another and are arranged and hardened on a mold, wherein, for forming each prepreg ply, several segments having a width corresponding to a length of the casing are arranged with an overlapping portion in a peripheral direction of the casing, wherein, in addition to the prepreg plies, prior to hardening, at least one reinforcement ply made of a prepreg strip arranged in several windings is arranged on the mold with an orientation of fibers in a direction of a longitudinal extension of the prepreg strip, the prepreg strip of each reinforcement ply being arranged with a lateral portion of one winding of the several windings overlapping a next winding of the several windings of the prepreg strip.

11. The method according to claim 10, wherein the prepreg strip of each reinforcement ply is arranged with a constant pitch angle.

12. The method according to claim 10, wherein the prepreg strip of each reinforcement ply is arranged with a continuous pitch.

13. The method according to claim 10, wherein at least one prepreg ply is used with an orientation of the fibers in the at least one prepreg ply being arranged at 0° or 90° relative to each other.

14. The method according to claim 10, wherein, for forming each prepreg ply, three or four segments are arranged.

15. The method according to claim 10, wherein the prepreg plies and the at least one reinforcement are made of fibers made of carbon and/or glass and/or aramide and/or ceramics.

16. The method according to claim 10, wherein the casing is a bypass pipe or a fan casing.

* * * * *